United States Patent [19]
McCormick

[11] 3,861,559
[45] Jan. 21, 1975

[54] INSTRUMENT CASING

[76] Inventor: John Paradis McCormick, 521 Hilmar St., Santa Clara, Calif. 95050

[22] Filed: July 11, 1973

[21] Appl. No.: 378,192

[52] U.S. Cl. .................. 220/82 A, 73/431
[51] Int. Cl. .......................... B65d 25/54
[58] Field of Search............ 220/82 R, 82 A; 73/431

[56] References Cited
UNITED STATES PATENTS

| | | | |
|---|---|---|---|
| 3,357,394 | 12/1967 | Ingham et al. | 73/431 X |
| 3,388,601 | 6/1968 | Ingham | 73/431 |
| 3,527,102 | 9/1970 | Harland | 73/431 |
| 3,530,723 | 9/1970 | Hogue et al. | 220/82 R X |
| 3,549,043 | 12/1970 | Waite | 220/82 A |
| 3,712,138 | 1/1973 | Alinari | 73/431 |

Primary Examiner—John Petrakes
Attorney, Agent, or Firm—John N. Randolph

[57] ABSTRACT

A casing for enclosing and hermetically sealing an instrument, such as a vacuum gauge, comprising, essentially, two cup shaped members one of which constitutes a lens through which the instrument can be visually read and the other of which constitutes a diaphragm which is capable of compensating for changes in ambient temperatures, to prevent pressure resulting therefrom affecting the accuracy of the instrument. A rubber stopper which is supported by a tube which extends from a shank of the guage bears against the exterior of the diaphragm which is thereby effectively sealed to the shank, tube and stopper.

2 Claims, 2 Drawing Figures

PATENTED JAN 21 1975 3,861,559

INSTRUMENT CASING

SUMMARY

It is a primary object of the present invention to provide an instrument casing of extremely simple construction which, by slight modification of a vacuum gauge, for example, may be applied so as to provide a hermetically sealed encasement for the gauge.

Another object of the invention is to provide such a casing including a part formed by a diaphragm which is capable of flexing to compensate for temperature variations so that pressures resulting therefrom will not be transmitted to the gauge to affect its operating efficiency.

Still a further object of the invention is to provide such a casing which may be very economically manufactured and sold, which is capable of being readily applied to conventional instruments, such as vacuum gauges, and which includes a transparent section providing a lens through which the instrument can be read.

Various other objects and advantages of the invention will hereinafter become more fully apparent from the following description of the drawing, illustrating a presently preferred embodiment thereof, and wherein:

DESCRIPTION OF THE PREFERRED EMBODIMENT

Figure 1:
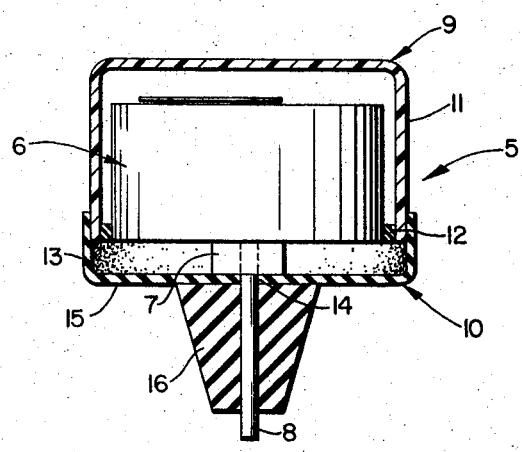
FIG. 1 is a substantially central vertical sectional view of the casing applied to a vacuum gauge.
Figure 2:
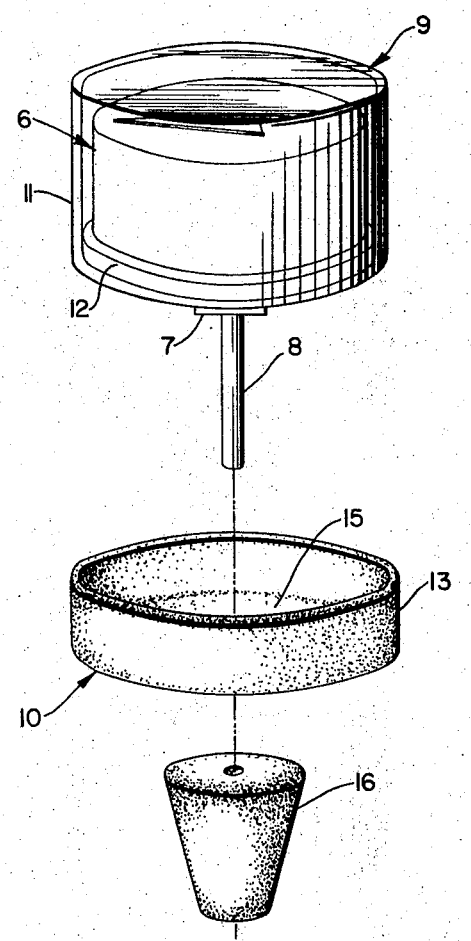
FIG. 2 is an exploded perspective view thereof.

Referring more specifically to the drawing, the casing comprising the invention is designated generally 5 and is shown applied to an instrument 6, herein illustrated as a vacuum gauge. A threaded part, not shown, is removed from the gauge 6 leaving a shank 7 thereof exposed. A tube 8 is added which is secured in and projects from the shank 7.

The casing 5 is composed primarily of two cup-shaped members 9 and 10. The cup-shaped member 9 is substantially deeper than the cup-shaped member 10 and is transparent and is preferably formed of plastic. Said member 9 provides a lens that is inverted to fit over the gauge 6. The annular wall 11 of the cover section 9 at its open lower end fits snugly around the annular flange 12 of the backplate of the gauge 6.

The case section 10 is formed of rubber or a similar impervious elastic material, is of a depth substantially less than the depth of the section 9, and has an annular side wall 13 which is of a diameter slightly larger than the diameter of the wall 11 and which partially overlaps the lower end of the wall 11, and is suitably bonded thereto to provide a hermetic seal. The bottom 15 of the section 10 has a central opening 14 through which the tube 8 extends.

A rubber stopper 16 fits snugly on the tube 8 and with its large end abutting the outer side of the bottom 15 around the opening 14 thereof. Said bottom 15 is suitably bonded to the shank 7, tube 8 and stopper 16, so that the case 5 provides a hermetically sealed enclosure for the gauge 6. In addition, the casing section 10 constitutes a diaphragm which is capable of collapsing inwardly or distending outwardly from its position of FIG. 1 to compensate for pressure variations caused by ambient temperatures so that the vacuum gauge 6 will be shielded from said pressure variations which could otherwise result in an inaccurate operation of the gauge.

The gauge 6 may constitute a radial readout gauge such as disclosed by my U.S. Pat. No. 3,806,851, issued Apr. 23, 1974. The stopper 16 is secured in the tubular portion 13 of the probe of said patent for connecting the probe to the gauge.

Various modifications and changes are contemplated and may be resorted to, without departing from the function or scope of the invention.

I claim as my invention:

1. A casing for an instrument, such as a vacuum gauge, comprising a transparent cup-shaped member disposed over and providing a lens for the gauge, a second cup-shaped member disposed behind the gauge and having an annular wall overlapping and sealed to the annular wall of the lens, said members being formed of impervious materials to provide a hermetically sealed enclosure for the gauge, said second member being formed of a thin walled elastic material to provide a diaphragm capable of collapsing or being distended to compensate for pressure variations caused by ambient temperatures, and means for supporting the casing on the gauge and for anchoring it thereto.

2. A casing as in claim 1, said means comprising a tube secured in and projecting from a bottom shank portion of the gauge and extending through a central portion of the bottom of said second member, and a rubber stopper secured on said tube, a central portion of said bottom of the second member being clamped between and bonded to the shank and stopper.

* * * * *